H. C. SHUBERT & C. L. EVINGTON.
GROWTH DESTROYER.
APPLICATION FILED AUG. 8, 1911.
1,035,056.
Patented Aug. 6, 1912.
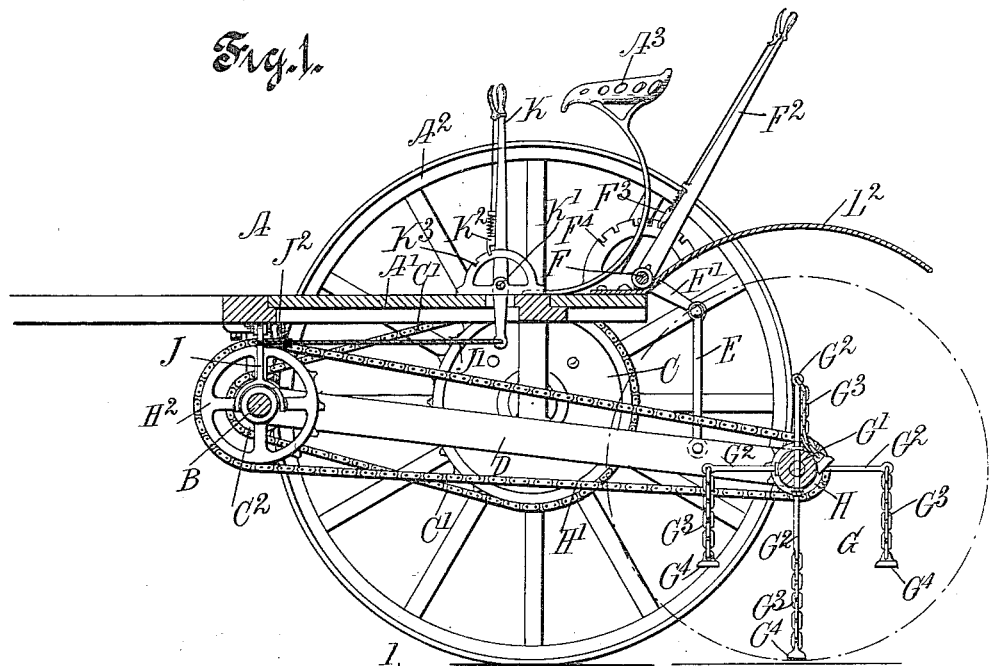
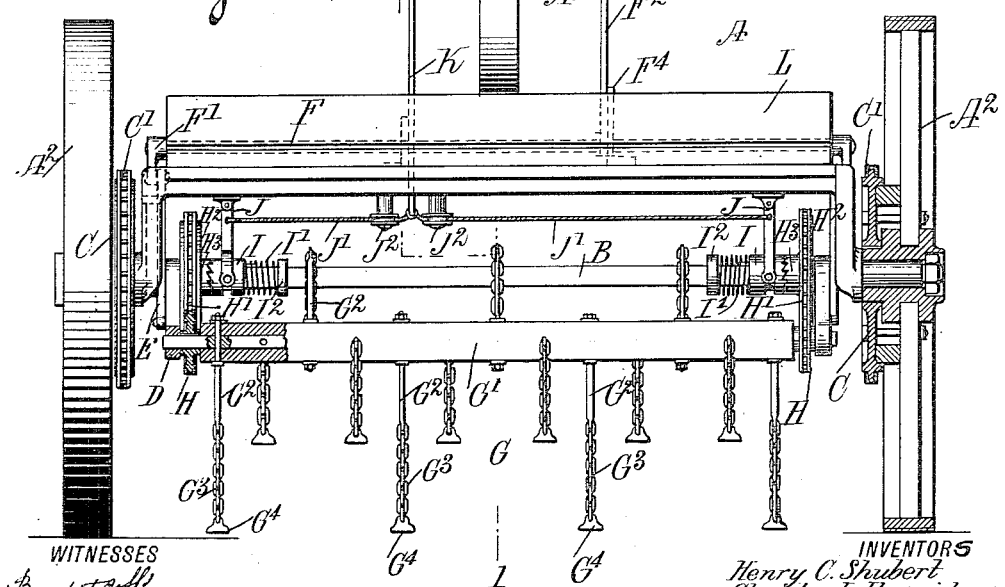
WITNESSES
INVENTORS
Henry C. Shubert
Charles L. Evington
BY
ATTORNEYS

UNITED STATES PATENT OFFICE.

HENRY C. SHUBERT AND CHARLES L. EVINGTON, OF RICHLAND, MISSOURI.

GROWTH-DESTROYER.

1,035,056.

Specification of Letters Patent.

Patented Aug. 6, 1912.

Application filed August 8, 1911. Serial No. 643,046.

*To all whom it may concern:*

Be it known that we, HENRY C. SHUBERT and CHARLES L. EVINGTON, both citizens of the United States, and residents of Richland, in the county of Pulaski and State of Missouri, have invented a new and Improved Growth-Destroyer, of which the following is a full, clear, and exact description.

The invention relates to agricultural machines, and its object is to provide a new and improved growth destroyer more especially designed for use on land that has been cleared of timber, to destroy the sprouts or returning second growth in a very simple and effective manner.

For the purpose mentioned, use is made of a wheeled vehicle adapted to be moved over the ground and provided with a revoluble beater having flexible arms adapted to forcibly strike and cut off the growth at or near the surface of the ground.

A practical embodiment of the invention is represented in the accompanying drawings forming a part of this specification, in which similar characters of reference indicate corresponding parts in both views.

Figure 1 is a sectional side elevation of the growth destroyer on the line 1—1 of Fig. 2; and Fig. 2 is a rear end elevation of the same, parts being in section.

The growth destroyer is mounted on a wheeled vehicle A adapted to be drawn over the ground by horse or motive power, and on the frame A' of the said vehicle A is journaled a transverse shaft B driven from the traction wheel $A^2$ of the vehicle by the use of a suitable driving gear, such, for instance, as shown in the drawings, and consisting essentially of a sprocket wheel C secured to the traction wheel $A^2$ and connected by sprocket chains C' with sprocket wheels $C^2$ secured on the transverse shaft B. Thus when the vehicle A is drawn over the ground a rotary motion is transmitted to the shaft B from the traction wheels $A^2$ by the gearing referred to.

On the shaft B is fulcrumed loosely a beater frame D extending rearwardly and supported near its rear end by links E extending upwardly and connected with arms F' held on a transverse shaft F journaled on the vehicle frame A'. A hand lever $F^2$ extends upwardly from the shaft F within convenient reach of the operator seated on the seat $A^3$ of the vehicle A. The hand lever $F^2$ is provided with a suitable locking device for holding the hand lever $F^2$ in any desired position, such locking device being preferably in the form of a manually-controlled locking catch $F^3$ adapted to engage a notched segment $F^4$ secured to the vehicle frame A', as shown in Fig. 1. By the arrangement described the beater frame D can be swung up or down by the operator manipulating the hand lever $F^2$ correspondingly. On the rear free end of the beater frame D is mounted a revoluble beater G consisting essentially of a drum G' journaled in the frame D and provided with radially-extending rigid arms $G^2$ on which are fastened chains or ropes $G^3$ terminating in beating blocks $G^4$ in the form of disks or the like, and sufficiently heavy to forcibly strike the growth at or near the ground with a view to destroying the growth. By reference to the drawings it will be noticed that the beater arms consisting of the rigid sections $G^2$ and the flexible sections $G^3$ are staggered on the drum G', so that when the machine is drawn over the ground a wide area is reached by the beaters to destroy the growth thereon. It is further understood that when the drum G' is rotated the flexible sections $G^3$ of the beating arms are radially extended owing to centrifugal force, and consequently the flexible beater sections $G^3$ strike the growth with considerable force but are not liable to be injured by the resistance offered by the growth, so that the said sections are free to yield owing to their flexibility.

The revoluble beater G is adapted to be driven from the shaft B, and for this purpose the following arrangement is made: On the drum G' are secured sprocket wheels H connected by sprocket chains H' with sprocket wheels $H^2$, mounted to rotate loosely on the shaft B, and the said sprocket wheels $H^2$ are provided with clutch members $H^3$ adapted to be engaged by clutch members I mounted to slide and to turn with the shaft B. The clutch members I are pressed on by springs I' coiled on the shaft B, to normally hold the clutch members I in engagement with the clutch members $H^3$. The springs I' abut at one end against collars $I^2$ secured on the shaft B, the other ends of the springs I' abutting against the clutch members I. The clutch members I are engaged by shifting arms J pivoted on the vehicle frame A' and connected with ropes J' extending around guide pulleys $J^2$ to connect with the lower end of a hand lever K fulcrumed at K' on the vehicle frame A' and within convenient reach of the operator seated on the seat A³. The hand lever K is provided with a suitable locking device to lock the hand lever K in any desired position, the said locking device consisting preferably of a manually-controlled catch K² mounted on the lever K and adapted to engage a notched segment K³ attached to the vehicle frame A'. When the machine is in use the hand lever K is in the position shown in the drawings, and the clutch members I are in engagement with the clutch members H³ so that a rotary motion given to the shaft B from the traction wheels A² is transmitted by the sprocket wheels H², H and the sprocket chains H' to the drum G' of the beater G, so that the beating arms are brought into contact with the growth to be destroyed, as previously explained. A hood L attached to the rear of the vehicle frame A' extends over the revoluble beater G so as to protect the operator seated on the seat A³ against injury by falling pieces set in motion by the beating arms of the revoluble beater G.

By having the beating arms provided with flexible sections, it is evident that the machine can be safely used on rough ground that has just been cleared of timber, and having many stumps, rocks and the like in the path of the beaters. It will also be noticed that the operator in charge of the machine and seated on the seat A³ can readily raise or lower the beater frame D to suit existing conditions, and the operator by controlling the lever K can stop or start the beater whenever desired.

Having thus described our invention, we claim as new and desire to secure by Letters Patent:—

1. A growth destroyer provided with a revoluble beater having flexible beater arms provided with blunt enlarged terminals, which are adapted to beat upon the surface of the ground, the said beater arms being held radially extended by centrifugal force on rotating the beater.

2. A growth destroyer provided with a beater, comprising a revoluble drum; and beater arms extending from the said drum and made in sections, of which the inner sections are rigid and attached to the drum and the outer sections are flexible throughout their length and terminate in blunt striking blocks.

3. A growth destroyer provided with a revoluble beater having flexible beater arms, the terminals of which are blunt and are adapted to beat upon the surface of the ground, when the beater is revolved.

In testimony whereof we have signed our names to this specification in the presence of two subscribing witnesses.

HENRY C. SHUBERT.
  CHARLES L. EVINGTON.

Witnesses:
 EVERIT A. OLIVER.
 ED. LINGSWIELER.